US010396710B2

(12) United States Patent
Chen et al.

(10) Patent No.: US 10,396,710 B2
(45) Date of Patent: Aug. 27, 2019

(54) MONITORING AND EVALUATING PERFORMANCE AND AGING OF SOLAR PHOTOVOLTAIC GENERATION SYSTEMS AND POWER INVERTERS

(71) Applicant: International Business Machines Corporation, Armonk, NY (US)

(72) Inventors: Sue Ann Chen, Melbourne (AU); Julian de Hoog, Melbourne (AU); Shivkumar Kalyanaraman, Bangalore (IN); Ramachandra R. Kolluri, Melbourne (AU); Arun Vishwanath, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 15/188,389

(22) Filed: Jun. 21, 2016

(65) Prior Publication Data

US 2017/0366010 A1    Dec. 21, 2017

(51) Int. Cl.
*H02J 3/38* (2006.01)
*H02J 3/50* (2006.01)
(Continued)

(52) U.S. Cl.
CPC .............. *H02S 50/10* (2014.12); *H02J 3/385* (2013.01); *H02J 3/50* (2013.01); *H02S 50/00* (2013.01); *Y02E 10/58* (2013.01)

(58) Field of Classification Search
CPC .............. H02J 3/383; H02J 3/50; H02S 50/10
See application file for complete search history.

(56) References Cited

U.S. PATENT DOCUMENTS

| 5,608,845 A * | 3/1997 | Ohtsuka ................... G07C 3/00 |
| | | 702/34 |
| 8,204,709 B2 | 6/2012 | Presher, Jr. et al. |
| | (Continued) | |

FOREIGN PATENT DOCUMENTS

| CN | 203117365 U | 8/2013 |
| WO | WO2010042717 A2 | 4/2010 |
| WO | WO2014081967 A1 | 5/2014 |

OTHER PUBLICATIONS

Lorenz, "Aging Analysis of Digital Integrated Circuits" Ph.D. dissertation, Technical University of Munich, 2012 (150 pages).

(Continued)

*Primary Examiner* — Regis J Betsch
(74) *Attorney, Agent, or Firm* — Grant Johnson; Michael J. Chang, LLC

(57) ABSTRACT

Techniques for detailed monitoring and evaluation of individual subsystems within solar photovoltaic power generation systems are provided. In one aspect, a method for monitoring a photovoltaic system having at least one array of photovoltaic panels and at least one inverter system configured to convert output from the panels from DC to AC includes the steps of: obtaining sensor data from the photovoltaic system; computing an efficiency of the panels and an efficiency of the inverter system using the sensor data; computing an aging parameter for the panels using the efficiency of the panels; computing an aging parameter for the inverter system using the efficiency of the inverter system; determining whether the aging parameter for the panels or for the inverter system exceeds a predetermined threshold level; and taking action if either the aging parameter for the array or for the inverter system exceeds the predetermined threshold level.

20 Claims, 6 Drawing Sheets

(51) Int. Cl.
 *H02S 50/00* (2014.01)
 *H02S 50/10* (2014.01)

(56) References Cited

U.S. PATENT DOCUMENTS

| | | |
|---|---|---|
| 2008/0306700 A1 | 12/2008 | Kawam et al. |
| 2010/0241375 A1 | 9/2010 | Kumar et al. |
| 2011/0066401 A1* | 3/2011 | Yang .................... G01J 1/4228 |
| | | 702/184 |
| 2012/0049879 A1 | 3/2012 | Crites |
| 2014/0149076 A1* | 5/2014 | Jarnason ................ H02S 50/10 |
| | | 702/182 |
| 2016/0190984 A1* | 6/2016 | Caine ..................... H02S 50/00 |
| | | 702/60 |

OTHER PUBLICATIONS

English Abstract Translation of CN203117365U by Shang Chao et al., Aug. 7, 2013.
Flicker et al., "PV Inverter Performance and Reliability: What is the Role of the Bus Capacitor?" 38th Photovoltaic Specialists Conference (PVSC), vol. 2, pp. 1-3 (Jun. 2012).
Armijo et al., "Inverter Electro-Thermal Modeling," 2015 NREL Photovoltaic Reliability Workshop (Mar. 2015) (24 pages).
O'Brien, "Understanding the value of a dependable solar warranty," The Fifth State, Jun. 2013 (4 pages).

\* cited by examiner

MONITORING AND EVALUATING PERFORMANCE AND AGING OF SOLAR PHOTOVOLTAIC GENERATION SYSTEMS AND POWER INVERTERS

FIELD OF THE INVENTION

The present invention relates to enhancing performance of solar photovoltaic generation systems, and more particularly, to a system and method to enable detailed monitoring and evaluation of individual subsystems within solar photovoltaic power generation systems.

BACKGROUND OF THE INVENTION

Recent years have seen the advent of solar photovoltaic systems as a major source of power generation, particularly in the residential sector, and this growth is set to further accelerate as installed prices for solar photovoltaic systems continue to drop. The efficiency of solar photovoltaic systems has become a very important consideration as more and more systems have been installed, and cost competitiveness makes it necessary to get as much value out of installed systems as possible. For instance, if one were to look at the ideal (expected) photovoltaic system output versus the actual output for a typical day it would likely be seen that the efficiency of the system is not 100% throughout the operating period and that (particularly during peak power periods) the actual output of the system does not approach the expected output.

Temporary causes for performance deficits (such as soiling) can be taken care of by regular maintenance, but such maintenance schedules can be optimized if the timing and rate of these temporary causes is better understood. At the same time, permanent and unavoidable factors (such as component aging and degradation) have to be understood in more detail in order to predict and maximize the long-term overall performance and expected output of these systems. Accurate modeling of the system can help to understand the degradation, however uncertainties due to variable operating conditions will limit the capabilities even of relatively accurate models. Accelerated aging tests, although standardized for component manufacture, also do not account for the different impacts of variable operating conditions and environmental impacts.

It is therefore of great value to have a simple way of monitoring and evaluating the full delivery chain of photovoltaic generation—from the moment electricity is generated in a solar panel, to the moment it is supplied to the home or electricity grid.

SUMMARY OF THE INVENTION

Provided herein are techniques for detailed monitoring and evaluation of individual subsystems within solar photovoltaic power generation systems. In one aspect of the invention, a method for monitoring a photovoltaic system having at least one array of photovoltaic panels and at least one inverter system configured to convert output from the array of photovoltaic panels from direct current (DC) to alternating current (AC) is provided. The method includes the steps of: obtaining sensor data from the photovoltaic system, wherein the sensor data includes i) ambient conditions at the array of photovoltaic panels, ii) photovoltaic panel current and voltage outputs, iii) current and voltage inputs to the inverter system, and iv) current and voltage outputs from the inverter system; computing an efficiency of the array of photovoltaic panels nPV using the sensor data; computing an efficiency of the inverter system nINV using the sensor data; computing an aging parameter for the array of photovoltaic panels using the efficiency of the array of photovoltaic panels nPV; computing an aging parameter for the inverter system using the efficiency of the inverter system nINV; determining whether the aging parameter for the array of photovoltaic panels or the aging parameter for the inverter system exceeds a predetermined threshold level; and taking action if either the aging parameter for the array of photovoltaic panels or the aging parameter for the inverter system exceeds the predetermined threshold level.

In another aspect of the invention, a system for monitoring a photovoltaic system having at least one array of photovoltaic panels and at least one inverter system configured to convert output from the array of photovoltaic panels from DC to AC is provided. The system includes sensors configured to obtain data from the photovoltaic system, wherein the data obtained from the photovoltaic system comprises i) ambient conditions at the array of photovoltaic panels, ii) photovoltaic panel current and voltage outputs, iii) current and voltage inputs to the inverter system, and iv) current and voltage outputs from the inverter system; and a processor device coupled to a memory, which is operative to: compute an efficiency of the array of photovoltaic panels nPV using the sensor data; compute an efficiency of the inverter system nINV using the sensor data; compute an aging parameter for the array of photovoltaic panels using the efficiency of the array of photovoltaic panels nPV; compute an aging parameter for the inverter system using the efficiency of the inverter system nINV; determine whether the aging parameter for the array of photovoltaic panels or the aging parameter for the inverter system exceeds a predetermined threshold level; and take action if either the aging parameter for the array of photovoltaic panels or the aging parameter for the inverter system exceeds the predetermined threshold level.

A more complete understanding of the present invention, as well as further features and advantages of the present invention, will be obtained by reference to the following detailed description and drawings.

DETAILED DESCRIPTION OF PREFERRED EMBODIMENTS

Figure 1:
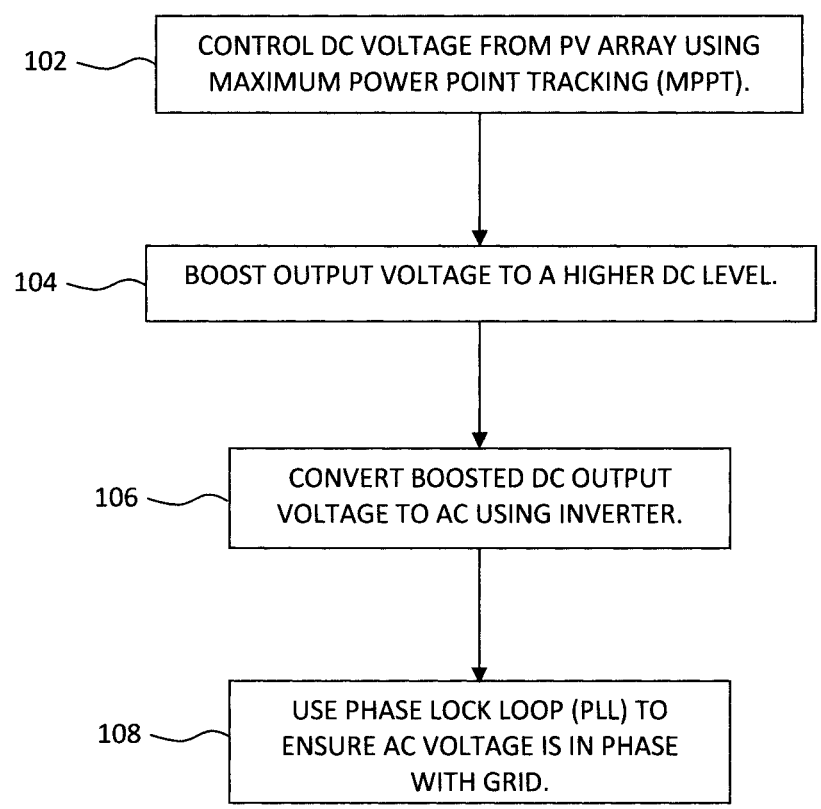
FIG. 1 is a diagram illustrating an exemplary methodology for converting output from a photovoltaic system from direct current (DC) to alternating current (AC) according to an embodiment of the present invention.

Provided herein are a system and method to enable detailed monitoring and evaluation of individual subsystems within solar photovoltaic power generation systems. Namely, the present techniques offer an efficient and effective means for monitoring and evaluating the full delivery chain of photovoltaic generation—from the moment electricity is generated in a solar panel, to the moment it is supplied to the home or electricity grid. Each step and each component in the generation of electricity using solar photovoltaic panels may be evaluated individually, providing a much more detailed understanding of where losses are introduced, and what may be done to eliminate or improve these.

Most of the existing work related to photovoltaic monitoring is centered around evaluating the performance of the given photovoltaic system from an alternating current (AC) output standpoint. For instance, current monitoring systems typically measure the actual AC output and compare it with the ideal output (based on photovoltaic system specifications, local weather, etc). Such a comparison provides an estimate of the overall system efficiency. This efficiency is then compared to an idealized system's (or other surrounding systems') efficiency to derive broader insights on whether it is producing as expected. Such a comparison does not, however, take into account the efficiency/degradation of individual subsystems (e.g., solar panels, inverters, etc.), which may vary widely. Therefore a rigorous subsystem-level evaluation is essential for fully comprehending system behavior and aging, and for better understanding how to eliminate or reduce sources of loss.

Such losses can come from two sets of sources. The first set is actual hardware-related losses (e.g., heat losses, etc.) that result in an overall reduction in the system output power. Most often, these hardware-related losses are a consequence of system design and are to a certain extent unavoidable. The second set of losses is the inefficiency in the system controls (MPPT tracking algorithm, etc.) driving the system away from the nominal operating point. These system control losses are often to a large part avoidable/correctable. The differentiation between these two sources of inefficiency is not well addressed in the existing techniques. The present system and method specifically differentiate between these two sets of losses, and using only minimal additional hardware make it possible to understand (and therefore improve) efficiency of photovoltaic generation in much greater detail.

The present techniques involve monitoring and evaluating all of the components in a photovoltaic system involved in the full delivery chain from original point of generation to final delivery of power to the house or grid. As will be described in detail below, this includes a monitoring and analysis of physical components, as well as analytics using data obtained by an accompanying suite of sensors, to jointly provide a detailed understanding of the sources of all possible inefficiencies and losses.

The resulting deep understanding of the losses and inefficiencies of photovoltaic generation systems makes it possible to: 1. evaluate general system performance; 2. evaluate individually each subsystem's performance; 3. trigger corrective processes in the event of imminent failure of any given component; 4. evaluate the efficiency of hardware components (which, while generally not alterable, can inform future design decisions); and 5. evaluate the efficiency of software and control components (which may well be operating below their maximum possible efficiency and can be improved). These characteristics make it possible to extract more value out of existing photovoltaic system; optimize system performance with respect to local network requirements; minimize the cost of component replacement (by targeting replacement of only those components that are failing); and design more efficient future photovoltaic systems.

Advantageously, the present techniques are adaptable to a range of system sizes (they can be applied per panel, or per system), and are topology and capacity independent; are communication capable for signaling and data acquisition; can determine both qualitative and quantitative aging at the subsystem level (something which is not possible with current technology); enable cloud-based threshold estimation—through comparative analytics; and provide data that can enable a plethora of insights into not just the system itself but its operating environment and the local grid conditions.

An overview of the technical components of a photovoltaic system is now provided. Generally, photovoltaic based generation systems can be divided into two major components, i) the array of (solar) photovoltaic panels (also referred to herein as a "photovoltaic array" or "PV array") which encompasses multiple solar panels, and ii) the power electronics based inverter system. The photovoltaic array consists of photovoltaic cells configured to achieve the desired voltage/current characteristics. The output of the photovoltaic array is in the form of direct current (DC) and needs to be converted into an alternating current (AC) form prior to local use or injection into the grid. See, for example, FIG. 2—described below.

This (DC-to-AC) conversion is carried out by the power electronics interface, in four main steps. See, for example, methodology 100 of FIG. 1. In step 102, the DC voltage of the photovoltaic array is controlled using maximum power point tracking (MPPT). MPPT is a technique that aims to find the best possible voltage to enable maximum power output from the photovoltaic array.

In step 104, the output DC voltage is boosted to a higher DC voltage to facilitate AC conversion. In step 106, the boosted DC voltage is converted into AC by the grid tie inverter by making use of standard switching and filtering techniques. Real and reactive power output is determined by controlling the inverter firing angle. Finally, in step 108, a phase lock loop (PLL) is used to ensure that the AC voltage is supplied to the grid in phase with the grid's AC voltage.

In general, total system efficiency is almost always evaluated using an overall efficiency estimation. However, this will not provide useful insights into the efficiencies of the individual subsystems. The present techniques address this need using a photovoltaic (PV) monitoring system having two main components. The first component, the photovoltaic (PV) component, is used to monitor the DC output from the photovoltaic arrays, as well as ambient conditions. See FIG. 2.

Figure 2:
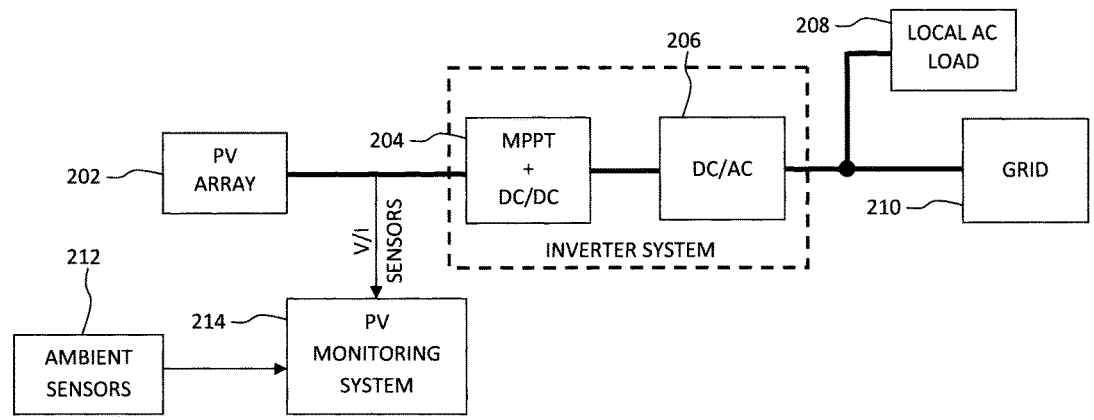
FIG. 2 is a diagram illustrating a photovoltaic (PV) component of the present photovoltaic (PV) monitoring system according to an embodiment of the present invention.

As shown in FIG. 2, and as described above, a photovoltaic-based generation system includes a PV array 202, an output of which is converted from DC to AC using an inverter system prior to local use (see Local AC Load 208) or injection into the grid 210. It is notable that while the systems are shown herein to contain a single photovoltaic panel array and single inverter, in practice, photovoltaic systems can include multiple arrays and/or inverters. As will be described in detail below, this can enable underperforming arrays/inverters to be taken offline/bypassed and either replaced or serviced. In the example shown in FIG. 2, the inverter system includes an MPPT (i.e., to control the DC voltage of the panels—see above) and DC-to-DC converter (i.e., to boost the DC voltage—see above) 204 and a DC-to-AC inverter 206 (i.e., to convert boosted voltage into AC—see above).

Unlike a conventional photovoltaic system, the present system includes a PV component to monitor the DC output from the array 202 and ambient conditions. Specifically, as shown in FIG. 2, the PV component includes ambient (condition) sensors 212 and output voltage (V) and current (I) sensors which feed sensor data to a PV component monitoring module 214. The output voltage and current sensors can collect voltage and current data from individual panels in the array, from the full array of panels, or both. Suitable ambient sensors include, but are not limited to, irradiance sensors, ambient and surface temperature sensors, (optical) dust sensors, humidity, air quality and/or barometric pressure sensors (e.g., which can be used to forecast changes in weather), etc. Each of these types of ambient sensors are commercially available. According to an exemplary embodiment, the ambient sensors are mounted in the proximity of the photovoltaic array 202. Irradiance sensors can be used to determine the density of (e.g., solar) radiation incident on the panels. Ambient temperature sensors can be used, e.g., to determine the surrounding temperatures of the subsystems (i.e., the panels, the inverter, etc.). Similarly, surface or internal temperature sensors can be used to measure the surface or internal temperatures of these components. Namely, regarding temperature it is important to monitor not just the ambient, but also the temperature of the components themselves. If there are faults or losses (for example, a piece of circuitry running hot due to excessive current) then unusual temperature will flag these. Humidity, air quality, and barometric sensors, etc., can be used to determine external influences on generation efficiency.

Data from the above-described sensors is fed into module 214 which will collect sensor data from, and monitor performance of the photovoltaic array 202. An exemplary methodology for evaluating the PV performance using the PV component is described in conjunction with the description of FIG. 5, below.

The second component in the present photovoltaic (PV) monitoring system is the inverter component. See FIG. 3. For ease and consistency of description, the same structures are numbered alike in the figures.

Figure 3:
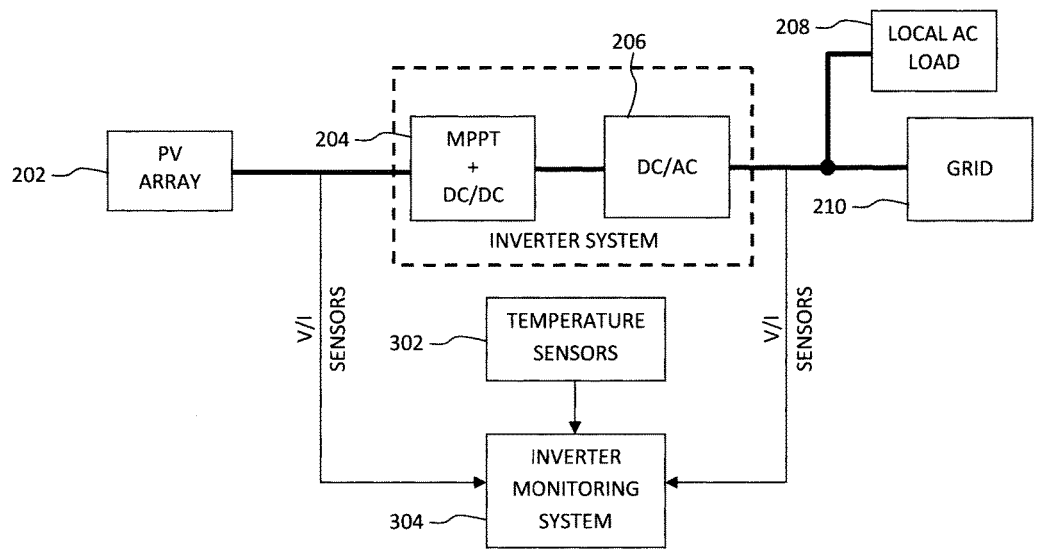
FIG. 3 is a diagram illustrating an inverter component of the present PV monitoring system according to an embodiment of the present invention.

As shown in FIG. 3, the inverter component uses one or more temperature sensors 302, along with voltage and current readings on either end of the inverter. This sensor data is feed to an inverter monitoring module 304. An exemplary methodology for evaluating the inverter performance using the inverter component is described in conjunction with the description of FIG. 6, below.

The following sections introduce some notation, describe typical nominal system performance characteristics and hardware warranties provided by manufacturers, and introduce ways to evaluate efficiencies of individual subsystems.

Notation and Efficiency Evaluation:
  Vdc is the output DC voltage measured at the photovoltaic panel terminals.
  Idc is the output DC current measured at the photovoltaic panel terminals.
  IRR is the input irradiance which discounts all the ambient parameter impacts—obtained from the local sensors.
  PIRR=f (IRR, system setup)=Maximum incident power on the photovoltaic panels. Since the irradiance values are obtained from a local sensor they already take into account the effects of dust and other ambient parameters. For instance, dust (as well as humidity and other factors—including clouds) can affect how much solar irradiation falls on the panels. If irradiation sensors are present directly next to the panels then they measure only the irradiation the panels themselves receive, and therefore provide a much better sense of whether the panels themselves are producing what they should be. Thus, it is assumed that the present equipment can measure soiling (such as from dust on the panels) accurately, so the power PIRR is the physical limit of the power that can be produced by any photovoltaic panel, for the given set-up.
  Pvoltage=f (Vdc, IRR)=Maximum amount of power the photovoltaic panel can produce at the given output DC voltage, Vdc.
  Pdc=Vdc×Idc=The actual production of the given photovoltaic panel configuration.
  nPV=Pdc/Pvoltage=The output efficiency of the photovoltaic panels.
  nMPPT=Pvoltage/PIRR=Is the tracking efficiency of the DC controller that implements the maximum power point algorithm. In other words, this parameter explains the inability of the DC controller to maintain the maximum power point voltage - which is in most cases correctable with minimum intervention.
  Vac is the AC output voltage from the inverter.
  Iac is the AC output current from the inverter.
  Pac=f (Vac, Iac)=The output power of the inverter system.
  nSYS=Pac/PIRR=The efficiency of the entire system.
  If nINV is the inverter efficiency and nDC is the efficiency pertaining to the remaining DC components (e.g., DC-DC converter, plus any losses in the electrical cables, any connectors, contacts, etc.), one can then write nSYS=nPV×nDC×nMPPT×nINV $$nINV \times nDC = nSYS/(nMPPT \times nPV)$$

Manufacturer-provided Efficiency and Normalizing:

To properly evaluate system efficiency, it is necessary to understand performance guarantees provided by manufacturers. For photovoltaic panels, typically two main types of power warranties are provided: step and linear. See, for example, O'Brien, "Understanding the value of a dependable solar warranty," The Fifth State, June 2013 (hereinafter "O'Brien"), the contents of which are incorporated by reference as if fully set forth herein. As described in O'Brien, a step warranty guarantees a minimum percentage of a panel's original rating over time, i.e., 90% over first 10 years, then it steps down to 80% after 10 years. A linear warranty, on the other hand, guarantees a minimum panel output for a certain amount of time (e.g., for the first 5 years) and a degradation rate (e.g., 0.5%) for each year after that. Under linear warranties, a panel is often guaranteed to produce 80 to 87 per cent of its original power output level at the end of the warranted period (often 20 years).

Degradation characteristics are not well known for some photovoltaic panels. Providing a step warranty is a conservative measure to eliminate warranty risks for the manufacturer. However, those details can also be used herein as normalizing parameters. For power inverters, warranties typically guarantee only that the inverter will not fail within a set number of years (often 10 years), but do not usually provide efficiency guarantees.

Method for Estimating Aging:

The ideal output efficiency of a photovoltaic system, nSYS,I (t), is supplied by the manufacturer. The efficiency nSYS,I (t) can be a constant and is given by nSYS,I. However in some cases the efficiency depreciation information might be available, for example, linear or step aging (as described above), and thus is a time-dependent variable. The normalized efficiency nSYS, norm is calculated herein using the computed and the supplied data, i.e., $$nSYS,\text{norm}(t)=nSYS(t)/nSYS,I(t).$$

Most electronic devices do not have any age determination methods, but it is understood that the efficiency trend of the device can relate to the aging/failure signature of the device. Therefore, according to an exemplary embodiment, aging ASYS(t) of the device is computed as the time derivative of its normalized efficiency, i.e., $$ASYS(t)=d(nSYS,\text{norm}(t))/dt.$$

The rate of aging RASYS(t) is also used herein as an indicator of the aging trend and to determine the risk of failure of the system, i.e., $$RASYS(t)=d(ASYS(t))/dt,$$

wherein t is the time and d/dt is the time derivative. Such values can be collected centrally (or, e.g., in the cloud), along with other system identification parameters (for example, PV manufacturer, etc.) to facilitate cloud based analytics and threshold estimation.

Figure 4:
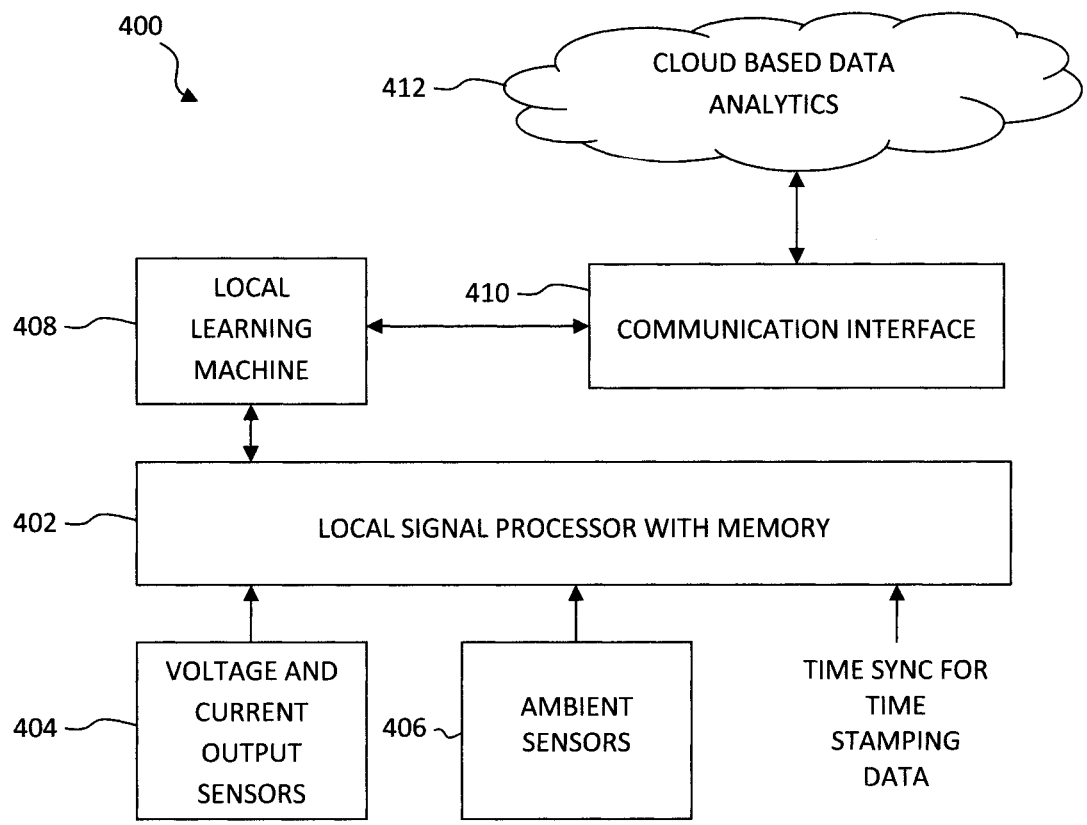
FIG. 4 is a diagram of an exemplary local advisory controller for coordinating the present monitoring and evaluating process according to an embodiment of the present invention.

FIG. 4 provides an exemplary local advisory controller 400 for coordinating the present process for monitoring and evaluating the individual subsystems (e.g., photovoltaic and inverter subsystems) of a photovoltaic based generation system. As shown in FIG. 4, the controller 400 includes a local signal processor with memory 402 which collects and stores data from the voltage and current sensors 404 (these are the sensors that collect output voltage (V) and current (I) from the photovoltaic panels 202 for the PV monitoring system (see FIG. 2) and from the DC and/or AC side of the inverter for the inverter monitoring system (see FIG. 3), from the ambient sensors 406 (these are the sensors that collect data regarding ambient conditions such as temperature, irradiance, etc. for the PV monitoring system (see FIG. 2) and the temperature for the inverter monitoring system (see FIG. 3). As shown in FIG. 4, the local signal processor with memory 402 provides time synchronization as required by time stamping the sensor data.

The local signal processor with memory 402 communicates with the cloud 412 via a communication interface 410 (e.g., application programming interfaces or APIs). By communicating with the cloud, the local signal processor with memory 402 can provide relevant data and receive relevant control commands as required. This communication ability enables remote monitoring of the photovoltaic system. A local learning machine 408 can be used to process data received from the local signal processor with memory 402 and/or from the cloud 412. For instance, the local learning machine 408 can compare present patterns to past patterns (and identify anomalies), compare patterns in this system to, e.g., nearby systems, or other systems composed of the same components to detect unexpected differences, etc.

As will be described in detail below, the local signal processor with memory 402 can be configured to perform the analytics associated with evaluating the PV (see methodology 500 of FIG. 5—described below) and inverter (see methodology 600 of FIG. 6—described below) subsystem performance, such as computing efficiency, aging, rate of aging, etc. based on the data from sensors 404, 406, etc. An apparatus that can be implemented as the local signal processor with memory 402 is provided, for example, in FIG. 7—described below.

Figure 5:
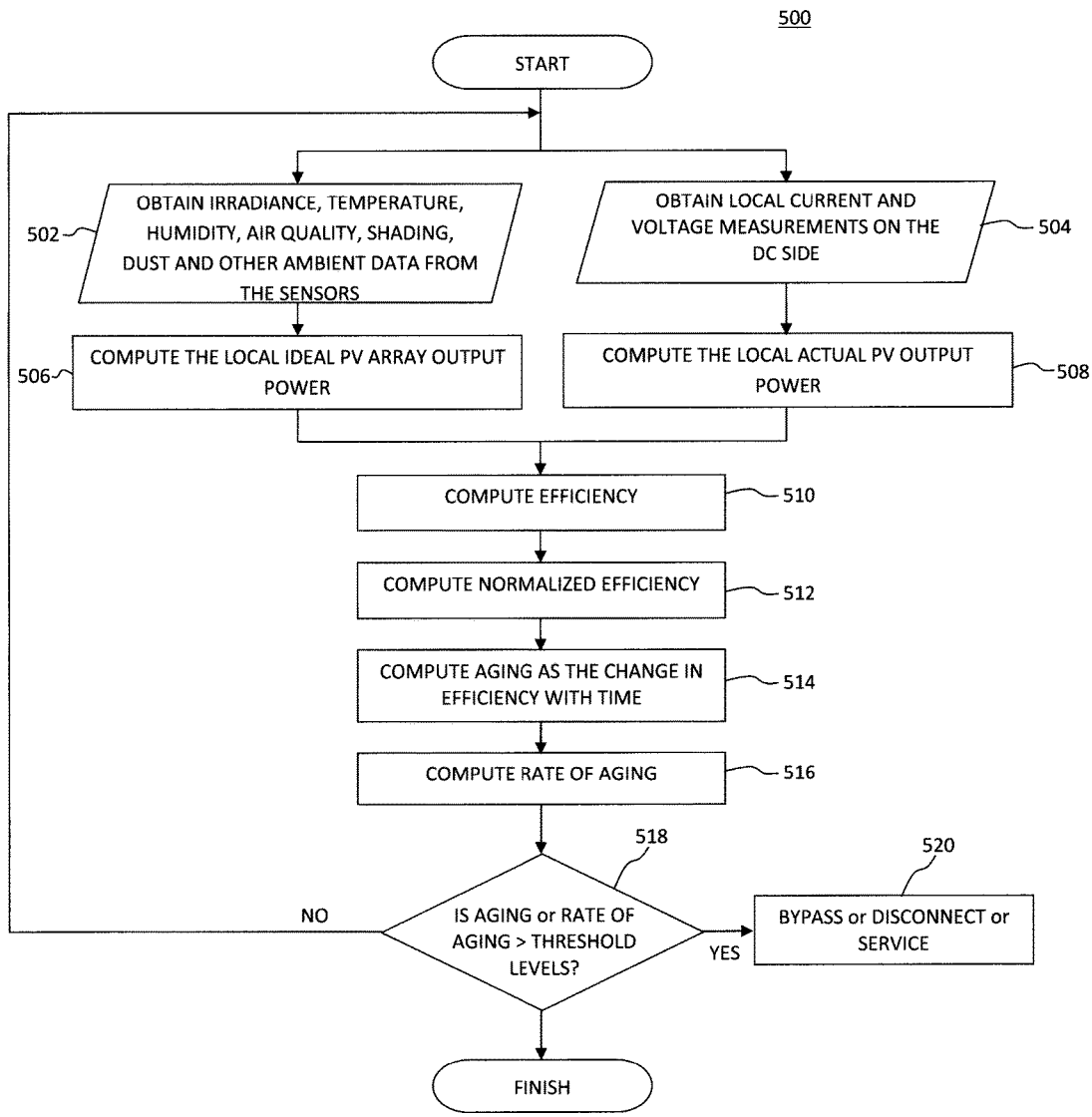
FIG. 5 is a diagram illustrating an exemplary methodology for evaluating the PV component according to an embodiment of the present invention.

Referring now to FIG. 5, an exemplary methodology 500 for evaluating the PV component is provided. The process begins by obtaining the ambient (in step 502) and DC-side current and voltage (in step 504) sensor data (i.e., via the ambient and V/I sensors—see FIG. 2). According to an exemplary embodiment, the ambient sensor data collected in step 502 includes one or more of irradiance, temperature, humidity, air quality, shading and dust data obtained by the respective sensors. For instance, as provided above, optical dust sensors may be employed. Shading can be identified via a basic optical device or image processing on simple camera data. As noted above, the irradiance data is discounted of effect of dust and other ambient parameters since the irradiance values are obtained from a local sensor. Shading generally refers to the partial or full blockage of light incident on a panel or panels. Shading can occur due to cloud cover, other panels in the path of sunlight, etc. Shading cuts down on the efficiency of the impacted panel(s). Like shading, soiling also reduces the efficiency of a panel(s). Soiling occurs when dirt, dust, and other environmental contaminants fall on the light absorbing surfaces of a panel. Naturally, this reduces the amount of incident light reaching the panel. Soiling effects can be reversed through maintenance (e.g., washing the panels to remove dust which has collected) and/or through natural rainfall onto the panels.

Based on the ambient sensor data, the ideal output power Pvoltage for the photovoltaic array is computed in step 506. As provided above, this represents the maximum amount of power the panel array can produce at a given output DC voltage, Vdc, and is which a function of input irradiance IRR discounting all ambient parameter impacts.

In step 508, the actual output power Pdc for the photovoltaic array is computed. As provided above, Pdc is calculated based on output DC current Idc and voltage Vdc measured at the panel terminals (i.e., the current and voltage sensor data from step 504).

In step 510, the output efficiency of the photovoltaic panels is computed. As provided above, the output efficiency of the photovoltaic panels is computed based on the ideal output power Pvoltage and the actual output power Pdc for the photovoltaic array.

The manufacturer provided efficiency specifications (e.g., step or linear—see above) can be used to normalize the output efficiency of the photovoltaic panels in step 512. In that case, the normalized efficiency is calculated based on the computed and (manufacturer) supplied data. For instance, in some cases, the photovoltaic panels can have their own efficiency curves. If that is the case, one can also make insights on the efficiency, aging, and rate of aging of the photovoltaic panels separately independent of the insights drawn on the overall system efficiency (see above). The aging and rate of aging formulas remain the same but the efficiency will now be the normalized photovoltaic panel efficiency.

In the manner highlighted above, the aging of the photovoltaic component can be computed as a time derivative of its normalized efficiency. See step 514. Aging is one parameter used herein to indicate the aging trend of the PV component. The aging can also be used to calculate the rate of aging as another indicator of the aging trend of the PV component. See step 516.

In step 518, a determination is made as to whether the aging or the rate of aging exceeds a (predetermined) threshold level. The threshold level can depend on the aging curves provided by the manufacturer. If it is determined in step 518 that (YES) the aging and/or rate of aging parameters exceed the threshold level, then in step 520 action is taken to address the problem. For instance, possible courses of action can include, but are not limited to, modifying the system by: bypassing the affected panel array (i.e., as noted above, photovoltaic systems may include more than one panel array and those that are affected can be taken off-line), scheduling maintenance for the affected panel array, and/or shutting down the system. Optionally, any of these actions can be carried out automatically, for example, via switches located at different points throughout the system (e.g., to bypass/take offline affected panel(s), shut down the system, etc.). As highlighted above, maintenance can involve operations as simple as cleaning the panels, i.e., to remove dust and other contaminants. Also, any damaged or broken panels can be replaced during maintenance. On the other hand, if it is determined in step 518 that (NO) the aging parameters do not exceed the threshold level, then the system continues to monitor the performance of the PV component by logging data and computing the efficiency of the next output sample. See FIG. 5.

As described, for example, in conjunction with the description of FIG. 4, above, the relevant data (sensor data, efficiency and aging computations, etc.) can be uploaded to the cloud, providing a valuable opportunity to analyze/compare/evaluate solar generation. As noted above, these calculations can be made with the other parameters (like nDC, nMPPT, etc.) which can also help to estimate the degradation of various subsystems individually. Normalizing the efficiency of these subsystems is harder for obvious reasons like the unavailability of normalizing efficiency.

Figure 6:
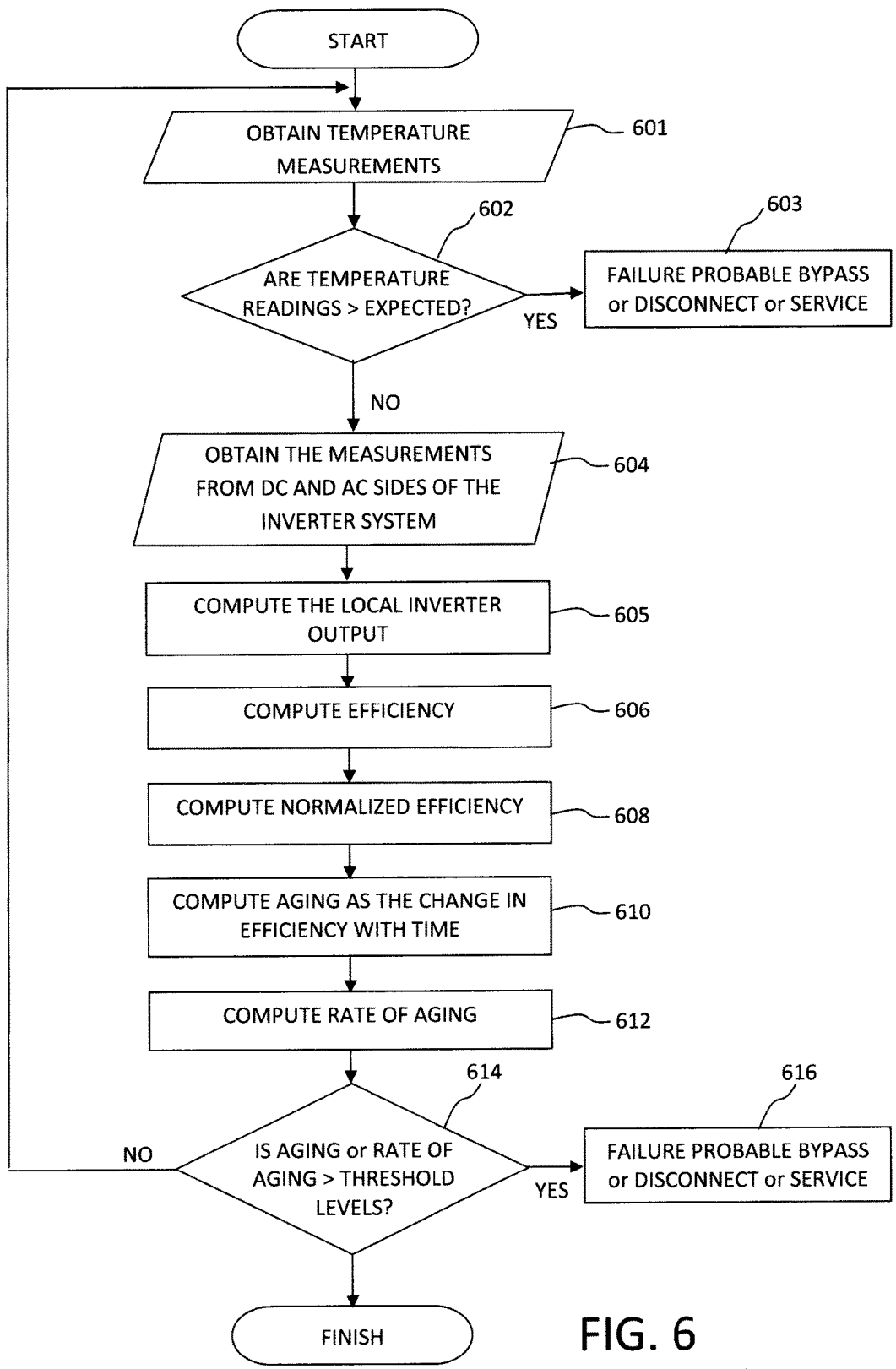
FIG. 6 is a diagram illustrating an exemplary methodology for evaluating the inverter component according to an embodiment of the present invention.

Referring now to FIG. 6, an exemplary methodology 600 for evaluating the inverter component is provided. The process begins in step 601 by obtaining local temperature sensor data. If it is determined in step 602 that (YES) the temperature exceeds a value normally expected for this inverter, then in step 603 it is concluded that system failure is probable, and action is taken to address the problem. For instance, possible courses of action can include, but are not limited to, bypassing the affected inverter, scheduling maintenance, and/or shutting down the system. On the other hand, if it is determined in step 602 that (NO) the temperature does not exceed a value normally expected for this inverter, then the process can continue to step 604, which involves obtaining the DC/AC-sides current and voltage sensor data (i.e., via the V/I sensors—see FIG. 3). As provided above, the output power of the inverter Pac can be computed based on this sensor data (i.e., based on the AC output voltage Vac and AC output current Iac from the inverter). See step 605.

In step 606, the inverter efficiency nINV is computed. According to an exemplary embodiment, the inverter efficiency nINV is estimated based on the power input (DC-side current and voltage) and the real power output values (from step 605). For instance, as provided above, the inverter efficiency nINV and the DC component efficiency nDC is given as nINV×nDC=nSYS/(nMPPT×nPV). While this does not differentiate between the efficiency of the inverter and DC components, some preset values can be attributed to each based on details provided by the inverter manufacturer. The accuracy of this inverter efficiency calculation will also depend on the types of voltage and current sensors, as well as their accuracy and resolution. Low resolution sensors will only enable estimation of degradation related to apparent power while high resolution sensors will enable a more detailed understanding of underlying contributions to degradation, including power factor, harmonics, etc.

In step 608, the efficiency is normalized using the manufacturer provided efficiency. Aging and rate of aging are calculated in steps 610 and 612, respectively, based on equivalent formulas shown earlier. Namely, as explained above, aging of the inverter component can be computed as a time derivative of its normalized efficiency. Aging and the rate of aging are two of the parameters used herein to indicate the aging trend of the PV and inverter components.

In step 614, a determination is made as to whether the aging or the rate of aging exceeds a (predetermined) threshold level (which can depend on the aging curves provided by the manufacturer). If it is determined in step 614 that (YES) the aging and/or rate of aging parameters exceed the threshold level, then in step 616 it is concluded that system failure is probable, and action is taken to address the problem. For instance, possible courses of action can include, but are not limited to, bypassing the affected inverter, scheduling maintenance, and/or shutting down the system. On the other hand, if it is determined in step 614 that (NO) the aging and/or rate of aging do not exceed the threshold level, then the process can continue to monitor the inverter component through iterative evaluations using updated measurement data. See FIG. 6. As described, for example, in conjunction with the description of FIG. 4, above, the relevant data (sensor data, efficiency and aging computations, etc.) can be uploaded to the cloud, providing a valuable opportunity to analyze/compare/evaluate solar generation.

The grid voltage variations are implicitly recorded from the output voltage measurement and therefore the effect of grid voltage on the system can also be monitored. Similar analytics on reactive power measurement will give insights on PLL accuracy and aging in the power electronic module. For instance, based on the grid measurements the voltage information of the grid is known. At the same time, the output current from the present system can be measured. For systems with unity power factor supply, the output current is fully in phase with the grid voltage. The present system can monitor changes in the supply characteristics of the PV inverter over time.

Recent changes in inverter design are facilitating real and reactive power (less than unity power factor) supply via the PV inverters. In such setups, the apparent power is compared with the input power and the efficiency is calculated. In situations where real and reactive power exports are explicitly available, the aging and rate of aging estimation for power as well as PLL aging estimation, can be performed as mentioned earlier.

With switching based DC/AC conversion taking place in the system, the total harmonic distortion (THD) is an important factor in determining the performance of the system. High frequency sampling based sensor and data acquisition will help in estimating the harmonic components of the voltage and current. Fourier analysis can be carried out locally within the estimator to reduce the overhead on data transfer to cloud based services. Aging and rate of aging in this case will estimate the overall filter aging characteristic and provide an insight on the anomalies of the system THD reduction performance. Temperature measurement together with the computed parameters like aging and rate of aging determine the susceptibility of system lifetime to temperature. Cloud based analytics can be used to determine a better estimation of prospective lifetime.

Since the grid voltage information is known, that means that the grid THD is known as well. The output current THD can be measured and the inaccuracy quantified. These things change over time and therefore can be attributed to the control system or filter aging.

Similarly, thermal signature indicates leakage currents or aging equipment within the device. The trends of these parameters can also help one understand the system performance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
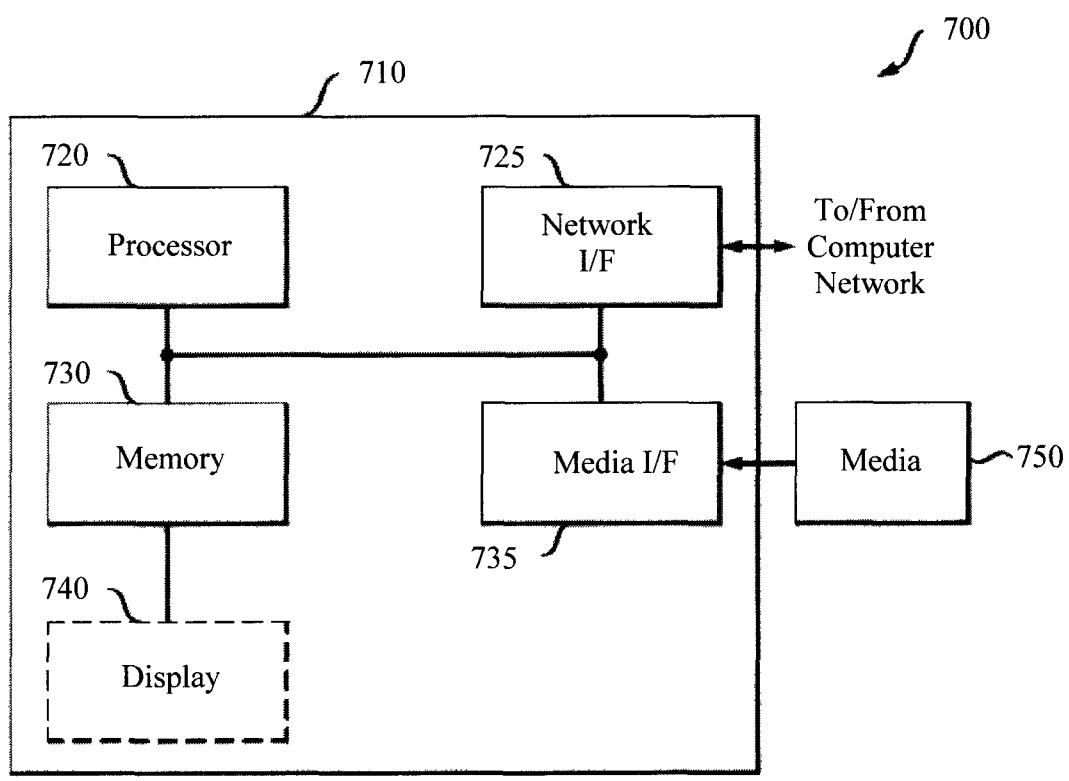
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. For example, as provided above, local signal processor with memory 402 can be embodied within an apparatus such as apparatus 700 and maybe configured to implement one or more of the steps of methodology 500 of FIG. 5 and/or methodology 600 of FIG. 6.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for monitoring a photovoltaic system having at least one array of photovoltaic panels and at least one inverter system configured to convert output from the array of photovoltaic panels from direct current (DC) to alternating current (AC), the method comprising the steps of:
    obtaining sensor data from the photovoltaic system, wherein the sensor data comprises i) ambient conditions at the array of photovoltaic panels, ii) photovoltaic panel current and voltage outputs, iii) current and voltage inputs to the inverter system, and iv) current and voltage outputs from the inverter system;
    computing an efficiency of the array of photovoltaic panels nPV using the sensor data;
    normalizing the efficiency of the array of photovoltaic panels nPV using efficiency specifications provided by a manufacturer of the array of photovoltaic panels;
    computing an efficiency of the inverter system nINV using the sensor data;
    computing an aging parameter for the array of photovoltaic panels using the efficiency of the array of photovoltaic panels nPV;
    computing an aging parameter for the inverter system using the efficiency of the inverter system nINV;
    determining whether the aging parameter for the array of photovoltaic panels or the aging parameter for the inverter system exceeds a predetermined threshold level; and
    taking action if either the aging parameter for the array of photovoltaic panels or the aging parameter for the inverter system exceeds the predetermined threshold level.

2. The method of claim 1, wherein the photovoltaic panel current and voltage outputs are obtained from individual photovoltaic panels in the array.

3. The method of claim 1, wherein the photovoltaic panel current and voltage outputs are obtained from the array of photovoltaic panels.

4. The method of claim 1, wherein the ambient conditions at the array of photovoltaic panels are selected from the group consisting of: irradiance, ambient temperature, surface temperature of the array of photovoltaic panels, and combinations thereof.

5. The method of claim 1, wherein the step of computing the efficiency of the array of photovoltaic panels nPV comprises the steps of:
    computing an ideal output power Pvoltage for the array of photovoltaic panels using the ambient conditions, wherein the ideal output power for the array of photovoltaic panels is a maximum amount of power the array of photovoltaic panels can produce at a given output voltage;
    computing an actual output power Pdc for the array of photovoltaic panels using the current and voltage output from the array of photovoltaic panels; and
    computing the efficiency of the array of photovoltaic panels nPV based on the ideal output power Pvoltage and the actual output power Pdc as nPV=Pdc/Pvoltage.

6. The method of claim 1, wherein the efficiency of the inverter system nINV is computed using the current and voltage input to the inverter system, and the current and voltage output from the inverter system.

7. The method of claim 1, further comprising the step of:
    normalizing the efficiency of the inverter system nINV using efficiency specifications provided by a manufacturer of the inverter system.

8. The method of claim 1, wherein the aging parameter for the array of photovoltaic panels comprises a time derivative of the efficiency of the array of photovoltaic panels nPV.

9. The method of claim 1, wherein the aging parameter for the array of photovoltaic panels comprises a time derivative of the efficiency of the inverter system nINV.

10. The method of claim 1, wherein the step of taking action comprises the step of:
    modifying the photovoltaic system by bypassing or disconnecting the array of photovoltaic panels if the aging parameter for the array of photovoltaic panels exceeds the predetermined threshold level.

11. The method of claim 1, wherein the step of taking action comprises the step of:
    scheduling service for the array of photovoltaic panels if the aging parameter for the array of photovoltaic panels exceeds the predetermined threshold level.

12. The method of claim 1, wherein the step of taking action comprises the step of:
    modifying the photovoltaic system by bypassing or disconnecting the inverter system if the aging parameter for the inverter system exceeds the predetermined threshold level.

13. The method of claim 1, wherein the step of taking action comprises the step of:
- scheduling service for the inverter system if the aging parameter for the inverter system exceeds the predetermined threshold level.

14. A system for monitoring a photovoltaic system having at least one array of photovoltaic panels and at least one inverter system configured to convert output from the array of photovoltaic panels from DC to AC, the system comprising:
- sensors configured to obtain data from the photovoltaic system, wherein the data obtained from the photovoltaic system comprises i) ambient conditions at the array of photovoltaic panels, ii) photovoltaic panel current and voltage outputs from the array of photovoltaic panels, iii) current and voltage inputs to the inverter system, and iv) current and voltage outputs from the inverter system; and
- a processor device coupled to a memory, wherein the processor device is operative to:
  - compute an efficiency of the array of photovoltaic panels nPV using the sensor data;
  - normalize the efficiency of the array of photovoltaic panels nPV using efficiency specifications provided by a manufacturer of the array of photovoltaic panels;
  - compute an efficiency of the inverter system nINV using the sensor data;
  - compute an aging parameter for the array of photovoltaic panels using the efficiency of the array of photovoltaic panels nPV;
  - compute an aging parameter for the inverter system using the efficiency of the inverter system nINV;
  - determine whether the aging parameter for the array of photovoltaic panels or the aging parameter for the inverter system exceeds a predetermined threshold level; and
  - take action if either the aging parameter for the array of photovoltaic panels or the aging parameter for the inverter system exceeds the predetermined threshold level.

15. The system of claim 14, wherein the ambient conditions at the array of photovoltaic panels are selected from the group consisting of: irradiance, ambient temperature, surface temperature of the array of photovoltaic panels, and combinations thereof.

16. The system of claim 14, wherein the processor device when computing the efficiency of the array of photovoltaic panels nPV, is further operative to:
- compute an ideal output power Pvoltage for the array of photovoltaic panels using the ambient conditions, wherein the ideal output power for the array of photovoltaic panels is a maximum amount of power the array of photovoltaic panels can produce at a given output voltage;
- compute an actual output power Pdc for the array of photovoltaic panels using the current and voltage output from the array of photovoltaic panels; and
- compute the efficiency of the array of photovoltaic panels nPV based on the ideal output power Pvoltage and the actual output power Pdc as nPV=Pdc/Pvoltage.

17. The system of claim 14, wherein the efficiency of the inverter system nINV is computed using the current and voltage input to the inverter system, and the current and voltage output from the inverter system.

18. The system of claim 14, wherein the aging parameter for the array of photovoltaic panels comprises a time derivative of the efficiency of the array of photovoltaic panels nPV.

19. The system of claim 14, wherein the aging parameter for the array of photovoltaic panels comprises a time derivative of the efficiency of the efficiency of the inverter system nINV.

20. The system of claim 14, wherein the processor device is further operative to:
- normalize the efficiency of the inverter system nINV using efficiency specifications provided by a manufacturer of the inverter system.

* * * * *